United States Patent [19]
Akiyama

[11] Patent Number: 5,361,290
[45] Date of Patent: Nov. 1, 1994

[54] CLOCK GENERATING CIRCUIT FOR USE IN SINGLE CHIP MICROCOMPUTER

[75] Inventor: Shin-ichiro Akiyama, Tokyo, Japan

[73] Assignee: NEC Corporation, Tokyo, Japan

[21] Appl. No.: 882,222

[22] Filed: May 13, 1992

[30] Foreign Application Priority Data

May 13, 1991 [JP] Japan ................... 3-107262

[51] Int. Cl.$^5$ ............ H03K 21/00; H03K 3/017
[52] U.S. Cl. ............. 377/47; 327/115; 327/116; 327/176; 327/295
[58] Field of Search ........... 307/271, 269, 265, 513; 328/60, 62, 63, 20, 72; 377/47

[56] References Cited

U.S. PATENT DOCUMENTS

| | | | |
|---|---|---|---|
| 4,471,299 | 9/1984 | Elmis ................ | 307/269 |
| 4,623,845 | 11/1986 | Ide .................. | 328/62 |
| 4,968,899 | 11/1990 | Katsutani et al. ..... | 307/269 |
| 4,985,640 | 1/1991 | Grochowski et al. ... | 307/269 |

Primary Examiner—Timothy P. Callahan
Assistant Examiner—My Trang Nu Ton
Attorney, Agent, or Firm—Foley & Lardner

[57] ABSTRACT

A basic clock signal generating circuit for use in a single chip microcomputer includes a frequency divider receiving an external clock signal for generating a frequency-divided clock signal, and a waveform shaping circuit receiving the frequency-divided clock signal output so as to generate a waveform-shaped frequency-divided clock as a basic clock of single chip microcomputer. An original oscillation clock generation circuit receives the external clock signal and generates an original oscillation clock having a frequency which is a-double of that of the basic clock. The basic clock and the original oscillation clock can be supplied to a peripheral circuit so that either the basic clock or the original oscillation clock can be selectively used in an internal circuit of the peripheral circuit.

4 Claims, 2 Drawing Sheets

CLOCK GENERATING CIRCUIT FOR USE IN SINGLE CHIP MICROCOMPUTER

BACKGROUND OF THE INVENTION

1. Field of the Invention

The present invention relates to a single chip microcomputer, and more particularly to a basic clock signal generating circuit for use in the single chip microcomputer.

2. Description of Related Art

A clock used for an internal operation of the single chip microcomputer is called "basic clock", which is generally generated by frequency-dividing an input clock and waveform-shaping the frequency-divided clock. In accordance with the basic clock thus generated, the internal operations of the conventional single chip microcomputer and operation of peripheral circuits are controlled.

A typical example of the basic clock signal generating circuit for use in the single chip microcomputer basically comprises an internal frequency divider receiving an external clock signal and a waveform shaping circuit receiving an output of the frequency divider and generating a first CPU clock $\phi_1$ and a second CPU clock $\phi_2$, which are basic clocks for a CPU internal clock, and which are supplied to the CPU and a peripheral circuit.

For example, the frequency of the external clock signal is 8 MHz, the frequency of the clock outputted from the frequency divider is 4 MHz. Therefore, the CPU clock $\phi_1$ and the CPU clock $\phi_2$ are also 4 MHz and are complementary to each other. The peripheral circuit receiving these complementary CPU clocks operates with a minimum clock width corresponding to that of the CPU clocks.

As seen from the above, in the conventional single chip microcomputer, all operations are controlled on the basis of the basic clock signals, which are frequency-divided by frequency dividers for various purposes. Accordingly, the peripheral circuit cannot operate at a speed higher than that of the basic clock signal.

SUMMARY OF THE INVENTION

Accordingly, it is an object of the present invention to provide a basic clock signal generating circuit which has overcome the above mentioned defect of the conventional one.

Another object of the present invention is to provide a basic clock signal generating circuit capable of allowing a peripheral circuit to operate at a speed higher than that of the basic clock signal.

The above and other objects of the present invention are achieved in accordance with the present invention by a basic clock signal generating circuit for use in a single chip microcomputer including a frequency divider receiving an external clock signal for generating a frequency-divided clock signal as a basic clock of single chip microcomputer, and an original oscillation clock generation circuit receiving the external clock signal for generating an original oscillation clock having a frequency which is a double of that of the basic clock.

The above and other objects, features and advantages of the present invention will be apparent from the following description of preferred embodiments of the invention with reference to the accompanying drawings.

DESCRIPTION OF THE PREFERRED EMBODIMENTS

Figure 1:
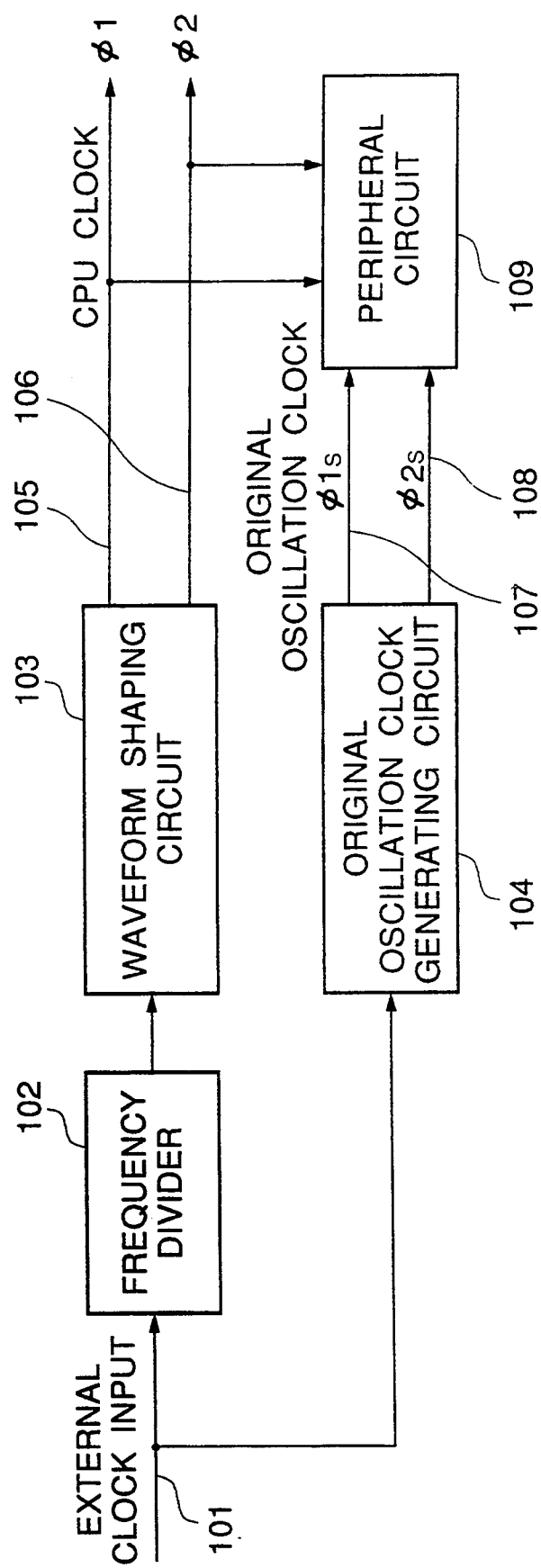
FIG. 1 is a block diagram showing an embodiment of the basic clock signal generating circuit in accordance with the present invention for use in single chip microcomputer.

Referring to FIG. 1, there is shown a block diagram showing an embodiment of the basic clock signal generating circuit in accordance with the present invention for use in single chip microcomputer.

In the shown basic clock signal generating circuit, an external clock signal 101 is supplied to a frequency divider 102, which has an output connected to an input of a waveform shaping circuit 103. In addition, the external clock signal 101 is also supplied to an original oscillation clock generating circuit 104.

The frequency divider 102 operates to divide the frequency of the received external clock signal 101 by two, and supply a frequency divided-by-two signal to the waveform shaping circuit 103. For example, if the frequency of the external clock signal 101 is 8 MHz, the output of the frequency divider 102 is 4 MHz. The waveform shaping circuit 103 generates a pair of complementary waveform-shaped clocks $\phi_1$ and $\phi_2$, which are labelled "CPU CLOCK" in FIG. 1 and which are basic clocks for a CPU internal clock. These CPU clocks $\phi_1$ and $\phi_2$ have the frequency of 4 MHz.

The original oscillation clock generating circuit 104 generates a pair of complementary clocks $\phi_{1S}$ and $\phi_{2S}$, which are labelled "ORIGINAL OSCILLATION CLOCK" in FIG. 1. The original oscillation clocks $\phi_{1S}$ and $\phi_{2S}$ have the same frequency as that of the external clock signal 101. In other words, the original oscillation clocks $\phi_{1S}$ and $\phi_{2S}$ have twice the frequency of the basic clocks $\phi_1$ and $\phi_2$.

The basic clocks $\phi_1$ and $\phi_2$ are supplied to a not-shown CPU (central processing unit). In addition, the basic clocks $\phi_1$ and $\phi_2$ and the original oscillation clocks $\phi_{1S}$ and $\phi_{2S}$ are supplied to a peripheral circuit 109. In the peripheral circuit 109, the basic clocks $\phi_1$ and $\phi_2$ are ordinarily used. In the case in which a high speed operation is required, the original oscillation clocks $\phi_{1S}$ and $\phi_{2S}$ are used in peripheral circuit 109.

Figure 2:
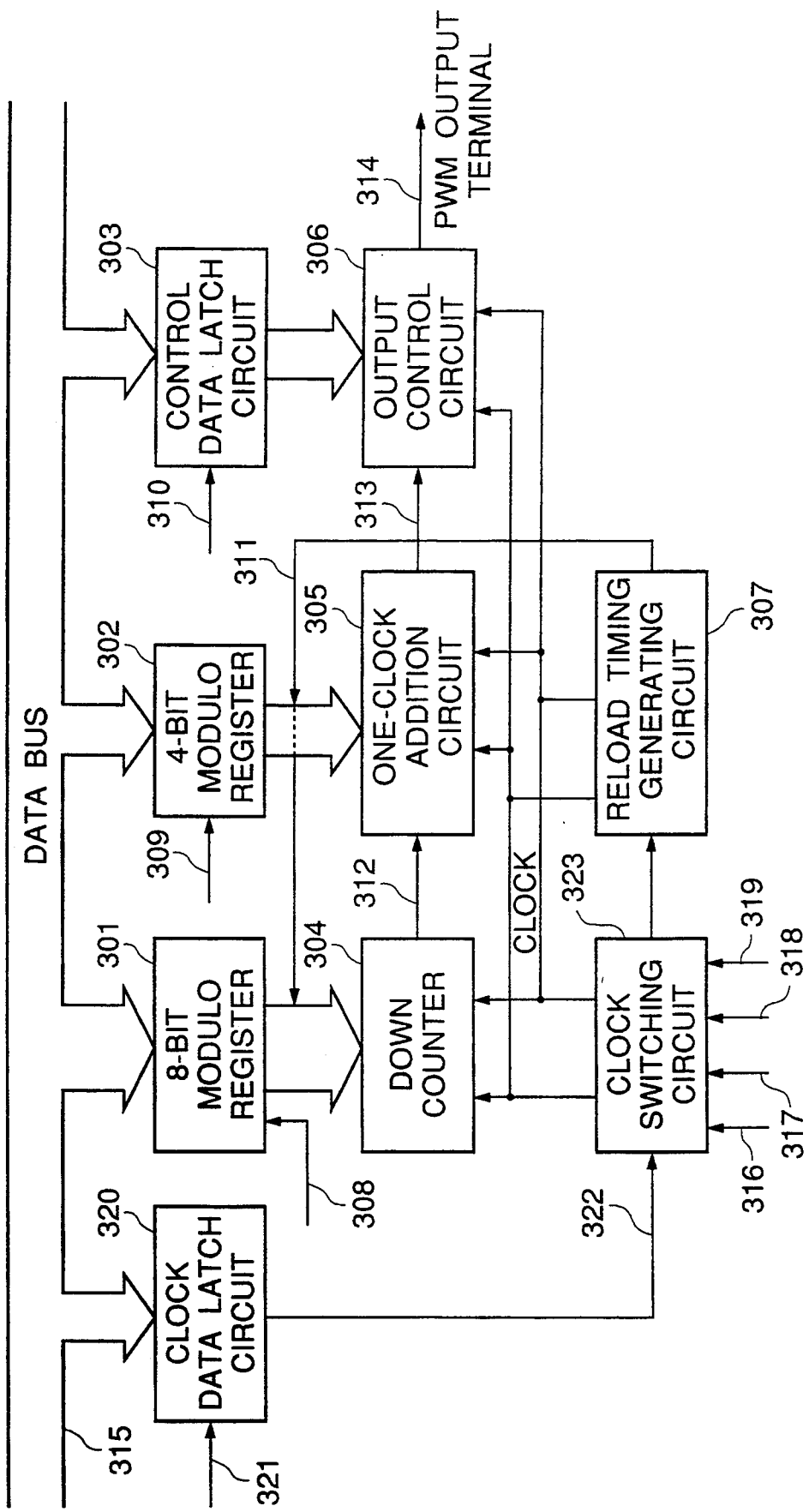
FIG. 2 is a block diagram showing an embodiment of a peripheral circuit which can operates receiving the basic clocks supplied from the basic clock signal generating circuit in accordance with the present invention.

Referring to FIG. 2, there is shown a block diagram of a PWM (pulse width modulation) output circuit which can operate receiving the basic clocks supplied from the basic clock signal generating circuit shown in FIG. 1. This PWM output circuit is one typical example of the peripheral circuit 109.

The shown PWM output circuit includes an 8-bit modulo register 301, a 4-bit modulo register 302, a control data latch circuit 303, and a clock data latch circuit 320, which are coupled to a data bus 315. The 8-bit modulo register 301, the 4-bit modulo register 302, the control data latch circuit 303, and the clock data latch circuit 320 hold or latch data on the data bus 315 in response to an 8 bit modulo register latch signal 308, a 4 bit modulo register latch signal 309, a control data latch signal 310, and a clock data latch signal 321, respectively.

The 8-bit modulo register 301, the 4-bit modulo register 302 and the control data latch circuit 303 have their outputs coupled to a down counter 304, a one-clock addition circuit 305, and an output control circuit 306, respectively.

The CPU clock $\phi_1$ 316, the CPU clock $\phi_2$ 317, the original oscillation clock $\phi_{1S}$ 318 and the original oscillation clock $\phi_{2S}$ 319 are supplied to a clock switching circuit 323. The clock switching circuit 323 is controlled by a clock data select signal 322 supplied from the clock data latch circuit 320, so as to select either the CPU clock $\phi_1$ 316 and the CPU clock $\phi_2$ 317, or the original oscillation clock $\phi_{1S}$ 318 and the original oscillation clock $\phi_{2S}$ 319, and to supply the selected pair of clocks to the down counter 304, the one-clock addition circuit 305, and the output control circuit 306, respectively, and also to a reload timing generating circuit 307. In other words, the clock switching circuit 323 selects which of the CPU clocks and the original oscillation clocks should be used for operating the PWM output circuit.

The reload timing generating circuit 307 generates a reload signal 311 to the down counter 304 and the one-clock addition circuit 305, so as to cause contents of the 8-bit modulo register 301 and the 4-bit modulo register 302 to be written to the down counter 304 and the one-clock addition circuit 305, respectively. The down counter 304 operates to decrement its content in response to the clock supplied from the clock switching circuit 323, and when the content of the down counter 304 becomes zero, the down counter 304 brings a coincidence signal 312 to a low level. The coincidence signal 312 is supplied to the one-clock addition circuit 305. This one-clock addition circuit 305 generates a PWM signal 313, which is supplied to the output control circuit 306, which generates a PWM output signal 314.

For example, the shown PWM output signal has a precision of 12 bits. Most significant 8 bits of the 12 bits determine the clock width, and least significant 4 bits of the 12 bits determine which of phases should be added with one clock in order to realize the precision of 12 bits. Thus, the precision of 12 bits is obtained as a whole. Accordingly, the pulse repetition frequency is fixed to $2^8$.

In this case, the reload timing generating circuit 307 generates the reload signal 311 at each 16 pulses having the pulse repetition frequency of $2^8$. In response to each reload signal 311, the contents of the 8-bit modulo register 301 and the 4-bit modulo register 302 are written to the down counter 304 and the one-clock addition circuit 305, respectively.

When the data is written into the down counter 304, the coincidence signal 312 is brought into a high level. The down counter 304 counts down in response to the clocks supplied from the clock switching circuit 323, and when the content of the down counter 304 becomes zero, the coincidence signal 312 is returned to a low level. At this time, it is some case that the high level period is prolonged by one clock period on the basis of the content of the one-clock addition circuit 305.

Thus, the PWM signal is generated from the one-clock addition circuit 305, and outputted through the output control circuit 305 to the PWM output terminal 314.

In this shown example, if the original oscillation clock is selected by the clock switching circuit 323 so as to be supplied to the PWM output circuit, the frequency of the PWM output signal can be doubled.

As seen from the above, since the basic clock signal generating circuit for use in the single chip microcomputer can supply a peripheral circuit with a clock signal having twice the frequency of the basic clock, if the high frequency clock is supplied to a circuit such as a PWM output circuit which requires a high precision, the frequency can be doubled.

A similar effect can be expected in other various peripheral circuits. For example, in case of a counter, the frequency of the counter can be doubled.

In the above mentioned embodiment, it is configured that the original oscillation clock has the frequency which is a double of the basic clock. However, it would be understood to persons skilled in the art that the frequency of the original oscillation clock is not limited to a double of the basic clock frequency, but the original oscillation clock can have the frequency which is "n" times the frequency of the basic clock, where "n" is a natural number not less than 2.

The invention has thus been shown and described with reference to the specific embodiments. However, it should be noted that the present invention is in no way limited to the details of the illustrated structures but changes and modifications may be made within the scope of the appended claims.

I claim:

1. A basic clock signal generating circuit for use in a single chip microcomputer, comprising:

a frequency divider receiving an external clock signal for generating a frequency-divided clock signal as a basic clock of the single chip microcomputer;

an original oscillation clock generation circuit receiving the external clock signal for generating an original oscillation clock having a frequency which is double that of the basic clock; and a pulse width modulation output circuit receiving the basic clock and the original oscillation clock, the pulse width modulation output circuit comprising:

an N-bit modulo register (where "N" is a positive integer) coupled to a data bus for latching N most significant bits of data on said data bus in response to an N-bit modulo register latch signal, said N most significant bits determining a clock width;

an M-bit modulo register (where "M" is a positive integer) coupled to said data bus for latching M least significant bits of data on said data bus in response to an M-bit modulo register latch signal, said M least significant bits determining which of a plurality of phases should be added with one clock in order to realize a precision (N+M) bits;

a control data latch circuit coupled to said data bus for latching data on said data bus in response to a control data latch signal;

a clock data latch circuit coupled to said data bus for latching a clock data on said data bus in response to a clock data latch signal, so as to generate a clock data select signal;

a down counter coupled to an output of said N-bit modulo register;

a one-clock addition circuit coupled to an output of said M-bit modulo register;

an output control circuit coupled to an output of said control data latch circuit;

a clock switching circuit receiving a first pair of clocks composed of a first CPU clock and a second CPU clock, and a second pair of clocks composed of a first original oscillation clock and a second original oscillation clock from said basic clock signal generating circuit, said clock switching circuit being controlled by said clock data select signal supplied from said clock data latch circuit, so as to select one pair of clocks from said first and second pairs of clocks, said selected pair of clocks being used for operation of the PWM output circuit, and to supply said selected pair of clocks to said down counter, said one-clock addition circuit, and said output control circuit; and a reload timing generating circuit receiving said selected pair of clocks and generating a reload signal to said down counter and said one-clock addition circuit, said reload signal causing contents of said N-bit modulo register and said M-bit modulo register to be written to said down counter and said one-clock addition circuit, respectively;

whereby said down counter operates to decrement its contents in response to said selected pair of clocks supplied from said clock switching circuit, and when the contents of said down counter become zero, said down counter provides a coincidence signal to said one-clock addition circuit; and said one-clock addition circuit responds to said coincidence signal to generate a PWM signal supplied to said output control circuit, said output control circuit generating a PWM output signal.

2. A basic clock signal generating circuit claimed in claim 1 further including a waveform shaping circuit receiving said frequency-divided clock signal output and for generating a waveform-shaped frequency-divided clock as said basic clock of single chip microcomputer 3. A pulse width modulation output circuit receiving the basic clock and the original oscillation clock, the pulse width modulation output circuit comprising:
an N-bit modulo register (where "N" is a positive integer) coupled to a data bus for latching N most significant bits of data on said data bus in response to an N-bit modulo register latch signal, said N most significant bits determining a clock width;
an M-bit modulo register (where "M" is a positive integer) coupled to said data bus for latching M least significant bits of data on said data bus in response to an M-bit modulo register latch signal, said M least significant bits determining which of a plurality of phases should be added with one clock in order to realize a precision (N+M) bits;
a control data latch circuit coupled to said data bus for latching data on said data bus in response to a control data latch signal;
a clock data latch circuit coupled to said data bus for latching a clock data on said data bus in response to a clock data latch signal, so as to generate a clock data select signal;
a down counter coupled to an output of said N-bit modulo register;
a one-clock addition circuit coupled to an output of said M-bit modulo register;
an output control circuit coupled to an output of said control data latch circuit;
a clock switching circuit receiving a first pair of clocks composed of a first CPU clock and a second CPU clock, and a second pair of clocks composed of a first original oscillation clock and a second original oscillation clock from said basic clock signal generating circuit, said clock switching circuit being controlled by said clock data select signal supplied from said clock data latch circuit, so as to select one pair of clocks from said first and second pairs of clocks, said selected pair of clocks being used for operation of the PWM output circuit, and to supply said selected pair of clocks to said down counter, said one-clock addition circuit, and said output control circuit; and a reload timing generating circuit receiving said selected pair of clocks and generating a reload signal to said down counter and said one-clock addition circuit, said reload signal causing contents of said N-bit modulo register and said M-bit modulo register to be written to said down counter and said one-clock addition circuit, respectively;

whereby said down counter operates to decrement its contents in response to said selected pair of clocks supplied from said clock switching circuit, and when the contents of said down counter become zero, said down counter provides a coincidence signal to said one-clock addition circuit; and said one-clock addition circuit responds to said coincidence signal to generate a PWM signal supplied to said output control circuit, said output control circuit generating a PWM output signal.

4. A pulse width modulation (PWM) output circuit receiving basic clocks supplied from a basic clock signal generating circuit, the PWM output circuit including:
an 8-bit modulo register coupled to a data bus for latching 8 most significant bits of data on said data bus in response to an 8-bit modulo register latch signal, said 8 most significant bits determining a clock width;
an 4-bit modulo register coupled to said data bus for latching 4 least significant bits of data on said data bus in response to a 4-bit modulo register latch signal, said 4 least significant bits determining which of a plurality of phases should be added with one clock in order to realize the precision of 12 bits;
a control data latch circuit coupled to said data bus for latching data on said data bus in response to a control data latch signal;
a clock data latch circuit coupled to said data bus for latching a clock data on said data bus in response to a clock data latch signal, so as to generate a clock data select signal;
a down counter coupled to an output of said 8-bit modulo register;
a one-clock addition circuit coupled to an output of said 4-bit modulo register;
an output control circuit coupled to an output of said control data latch circuit;
a clock switching circuit receiving a first pair of clocks composed of a first CPU clock and a second CPU clock, and a second pair of clocks composed of a first original oscillation clock and a second original oscillation clock from said basic clock signal generating circuit, said clock switching circuit being controlled by said clock data select signal supplied from said clock data latch circuit, so as to select one pair of clocks from said first and second pairs of clocks, said selected pair of clocks being used for operation of the PWM output circuit, and to supply said selected pair of clocks to said down counter, said one-clock addition circuit, and said output control circuit; and a reload timing generating circuit receiving said selected pair of clocks and generating a reload signal to said down counter and said one-clock addition circuit, said reload signal causing contents of said 8-bit modulo register and said 4-bit modulo register to be written to said down counter and said one-clock addition circuit, respectively.

whereby said reload timing generating circuit generates said reload signal once for each 16 clock pulses having the pulse repetition frequency of $2^8$, and in response to each reload signal, the contents of said 8-bit modulo register and said 4-bit modulo register are written to said down counter and said one-clock addition circuit, respectively, and when the data is written into said down counter, said coincidence signal is brought into an active level, so that said down counter counts down in response to the clocks supplied from said clock switching circuit, and when the contents of said down counter become zero, said coincidence signal is returned to an inactive level such that an active level period is prolonged by one clock period on the basis of the content of said one-clock addition circuit, the PWM signal being generated from said one-clock addition circuit and outputted through said output control circuit to a PWM output terminal.

* * * * *